United States Patent
Tan

(10) Patent No.: US 12,442,837 B2
(45) Date of Patent: Oct. 14, 2025

(54) REAL-EQUIVALENT-TIME CLOCK RECOVERY FOR A NEARLY-REAL-TIME REAL-EQUIVALENT-TIME OSCILLOSCOPE

(71) Applicant: Tektronix, Inc., Beaverton, OR (US)

(72) Inventor: Kan Tan, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 544 days.

(21) Appl. No.: 17/894,927

(22) Filed: Aug. 24, 2022

(65) Prior Publication Data

US 2023/0070298 A1 Mar. 9, 2023

Related U.S. Application Data

(60) Provisional application No. 63/237,503, filed on Aug. 26, 2021.

(51) Int. Cl.
*G01R 13/02* (2006.01)
*G01R 23/02* (2006.01)

(52) U.S. Cl.
CPC ....... *G01R 13/029* (2013.01); *G01R 13/0218* (2013.01); *G01R 23/02* (2013.01)

(58) Field of Classification Search
CPC .. G01R 13/029; G01R 13/0218; G01R 23/02; G01R 13/0272
See application file for complete search history.

(56) References Cited

U.S. PATENT DOCUMENTS

| | | | | |
|---|---|---|---|---|
| 4,621,217 A | * | 11/1986 | Saxe | G01R 13/34 708/319 |
| 5,115,189 A | * | 5/1992 | Holcomb | G01R 13/345 345/440.1 |
| 5,233,546 A | * | 8/1993 | Witte | G01R 23/167 708/3 |
| 2014/0232581 A1 | * | 8/2014 | Nguyen | H03M 1/126 341/155 |
| 2019/0129026 A1 | * | 5/2019 | Sumi | G01S 7/52041 |

* cited by examiner

*Primary Examiner* — Lee E Rodak
*Assistant Examiner* — Byung Ro Lee
(74) *Attorney, Agent, or Firm* — Miller Nash LLP; Andrew J. Harrington

(57) ABSTRACT

A test and measurement device has an input port to receive a signal from a device under test (DUT), the signal having a symbol rate, one or more analog-to-digital converters (ADC) to convert the signal to waveform samples at a sampling rate, and one or more processors, when aliasing is present: up-sample a portion of the signal having aliased samples to produce up-sampled samples; use the up-sampled samples to produce a real-time waveform; perform clock recovery on the real-time waveform to produce a recovered clock; and resample the aliased samples to produce a non-aliased waveform.

18 Claims, 9 Drawing Sheets

REAL-EQUIVALENT-TIME CLOCK RECOVERY FOR A NEARLY-REAL-TIME REAL-EQUIVALENT-TIME OSCILLOSCOPE

CROSS-REFERENCE TO RELATED APPLICATIONS

This disclosure claims benefit of U.S. Provisional Application No. 63/237,503, titled "REAL-EQUIVALENT-TIME CLOCK RECOVERY FOR A NEARLY-REAL-TIME REAL-EQUIVALENT-TIME OSCILLOSCOPE," filed on Aug. 26, 2021, the disclosure of which is incorporated herein by reference in its entirety.

TECHNICAL FIELD

This disclosure relates to test and measurement instruments, and more particularly to a Real-Equivalent-Time (RET) oscilloscope.

BACKGROUND

Conventional real-time oscilloscopes can achieve a high acquisition rate but have high cost due to a larger number of hardware components to achieve the high acquisition rate, such as a larger number of analog-to-digital converters (ADC). Equivalent-time (ET) oscilloscopes have a slower acquisition rate, but may have higher signal fidelity. These also have a higher cost because of their use of a hardware trigger.

Real-Equivalent-Time (RET) oscilloscopes, to test and measure the high-speed signals, have been introduced in U.S. patent application Ser. No. 17/182,056, filed Feb. 22, 2021, and published as U.S. Pat. App. Pub. No. 2021/0263085, hereinafter "Tan," the contents of which are hereby incorporated by reference in their entirety. RET oscilloscopes can achieve faster acquisition than the ET oscilloscopes at a lower cost. The need for high-speed acquisition of signals to be converted to waveforms results from the growing use of high-speed signals.

In the high-speed NRZ (Non-Return to Zero), PAM-n (Pulse Amplitude Modulation where n is the number of levels) and n-QAM (Quadrature Amplitude Modulation, where n is the order) signaling systems, there are signal impairments that can cause the waveform eye diagrams to be nearly or completely closed. See, for example, IEEE, "IEEE P802.3bs D3.5, Draft standard for Ethernet amendment 10: media access control parameters, physical layers and management parameters for 200 Gbs/and 400 Gb/s operation," 2017; IEEE, "IEEE P802.3cd D3.5, Draft standard for Ethernet amendment 3: media access control parameters for 50 Gb/s and physical layers and management parameters for 50 Gb/s, 100 Gb/s and 200 Gbs operation," 2018. Such factors include the transmitter equalizer such as pre-emphasis, de-emphasis, the channel loss in the electrical and optical part of the systems, and the dispersion in the optical part of the systems.

When the eye diagram is nearly or completely closed, the RET software Clock Data Recovery (CDR) described in Tan may have increased error or completely fail to recover the clock since the CDR relies on the signal having an opened eye diagram to recover the clock accurately.

DETAILED DESCRIPTION

Real-Equivalent-Time (RET) oscilloscopes may have a sample rate close to, but not high enough, to support a real-time oscilloscope channel. This can lead to aliasing, so the embodiments here employ a new software clock recovery technique that can handle the signals with more impairments for this type of RET oscilloscopes. This discussion may refer to this new clock recovery technique as "nearly-RT RET clock recovery."

Nearly-RT RET oscilloscopes are RET oscilloscopes have the sample rate very close to high enough, but not actually high enough, to support a real-time oscilloscope channel. The sample rate is at least higher than the input signal's symbol rate. The symbol rate is bit rate for the NRZ signals and is the baud rate for the PAM4 signals. The following equation (1) and (2) are the two conditions for the definition of a Nearly-RT RET oscilloscope:

$$\frac{f_s}{2} \leq Bandwidth \quad (1)$$

$$f_s > SymbolRate \quad (2)$$

where $f_s$ is the oscilloscope sample rate, Bandwidth is the oscilloscope analog bandwidth, SymbolRate is the input signal's symbol rate. Note that the definition of the Nearly-RT RET oscilloscope is determined by both the oscilloscope's analog bandwidth, sample rate, and the signal's symbol rate. This is the most common use case when using RET scheme to increase the high bandwidth channel count on the real-time oscilloscopes. For example, a 4-channel real-time oscilloscope may have total of 200 GS/s ADC; to support 33 GHz analog channels in the real-time sample mode, the maximum channel count is two. If the 200 GS/s is distributed to all four channels, then the sample rate of 50 GS/s for each channel can no longer support the 33 GHz analog bandwidth for the real-time sample mode. However, the sample rate of 50 GS/s is high enough so that the RET mode can support the 33 GHz bandwidth, according to embodiments of the disclosure and as set out in Tan.

Figure 1:
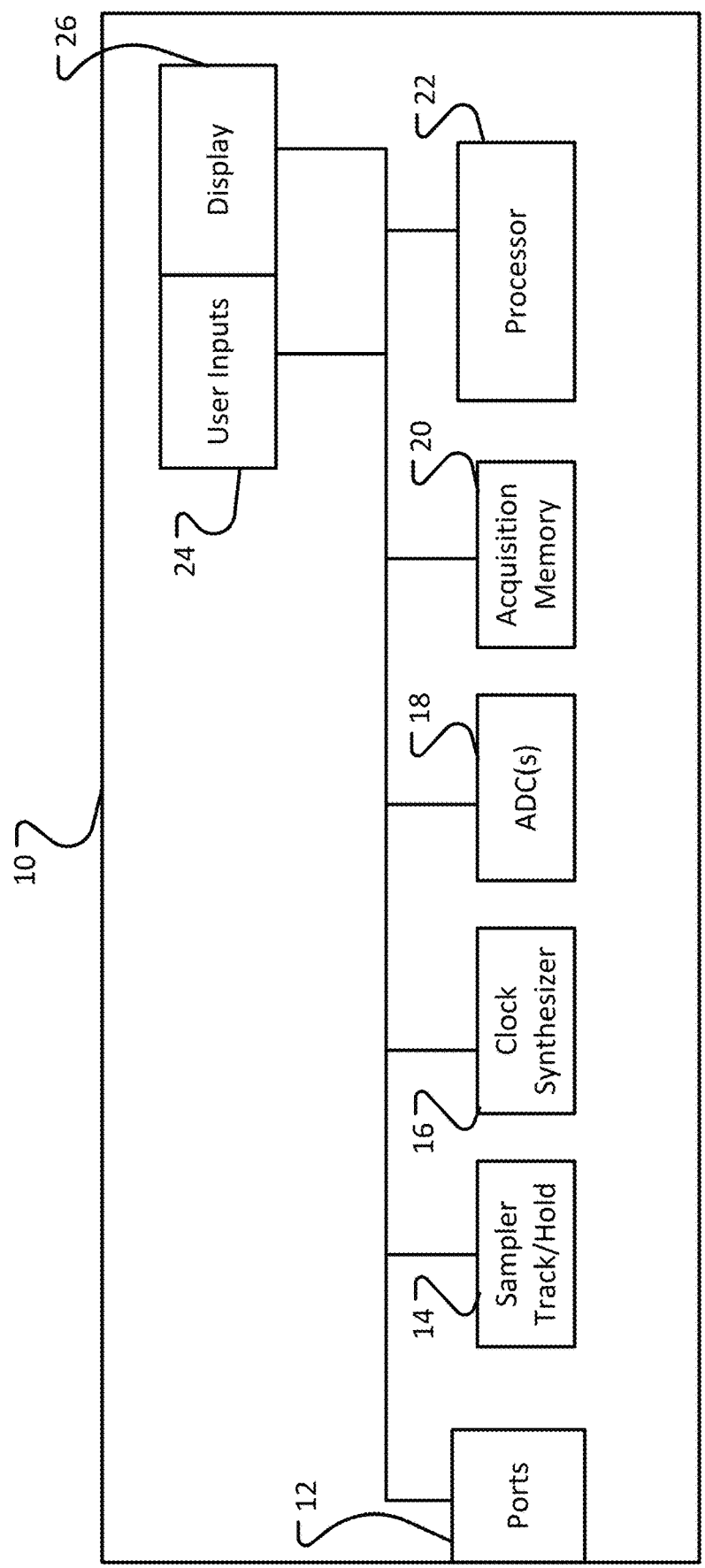
FIG. 1 shows an embodiment of a test and measurement device.

FIG. 1 shows an embodiment of a test and measurement device 10. The below discussion will refer to this device as an RET oscilloscope ("RET scope"), but no limitation to an oscilloscope is intended. FIG. 1 illustrates an example block diagram of a real-equivalent-time test and measurement instrument 10 according to some configurations of the disclosure. The test and measurement instrument 10 includes one or more ports 12, which may be any electrical signaling medium. Ports 12 may include receivers, transmitters, and/or transceivers. Each port 12 may comprise a channel of the test and measurement instrument 10. An example of an RET oscilloscope is discussed in Tan.

A port 12 receives a signal from a device under test (DUT) and sends it to a sampler track and hold circuit 14. The track and hold circuit 14 holds each signal steady for a period of time sufficient to enable analog to digital conversion by one or more high-resolution analog-to-digital converter(s) (ADC) 18. The ADC may receive a sample clock from the clock synthesizer 16 under control of one or more processors 22.

The ADC 18 converts the analog signal from the track and hold circuit 14 to a digital signal. The ADC 18 has a sampling rate, discussed in more detail below. For example, the ADC 18 can sample the signals from a few GS/s to hundreds of GS/s. In some configurations, the ADC 18 can sample the analog signal between 1 GS/s to 200 GS/s. In other configurations, the ADC 18 can sample the analog signal between 2 GS/s and 25 GS/s. The digitized signal from the ADC 18 can then be stored in an acquisition memory 20. The ADC 18 could be a single high-resolution ADC, such as a 12-bit ADC.

The one or more processors 22 may be configured to execute instructions from memory and may perform any methods and/or associated steps indicated by such instructions. These may include receiving the acquired signals from the acquisition memory 20 and reconstructing the signal under test without the use of a hardware trigger or acquiring the sample in the high acquisition rate.

Memory 20 or any other memory on the test and measurement instrument 10 may be implemented as processor cache, random access memory (RAM), read only memory (ROM), solid state memory, hard disk drive(s), or any other memory type. Memory acts as a medium for storing data, computer program products, and other instructions.

User interface 24 is coupled to the one or more processors 22. User interface 24 may include a keyboard, mouse, trackball, touchscreen, and/or any other controls employable by a user to interact with a GUI on the display 26. The display 26 may be a digital screen, a cathode ray tube based display, or any other monitor to display waveforms, measurements, and other data to a user.

While the components of the test and measurement instrument 10 are depicted as being integrated within test and measurement instrument 10, it will be appreciated by a person of ordinary skill in the art that any of these components can be external to the test and measurement instrument 10. They may couple to the test and measurement instrument 10 in any conventional manner, such as wired and/or wireless communication media and/or mechanisms. For example, in some examples, the display 26 may be remote from the test and measurement instrument 10.

Figure 2:
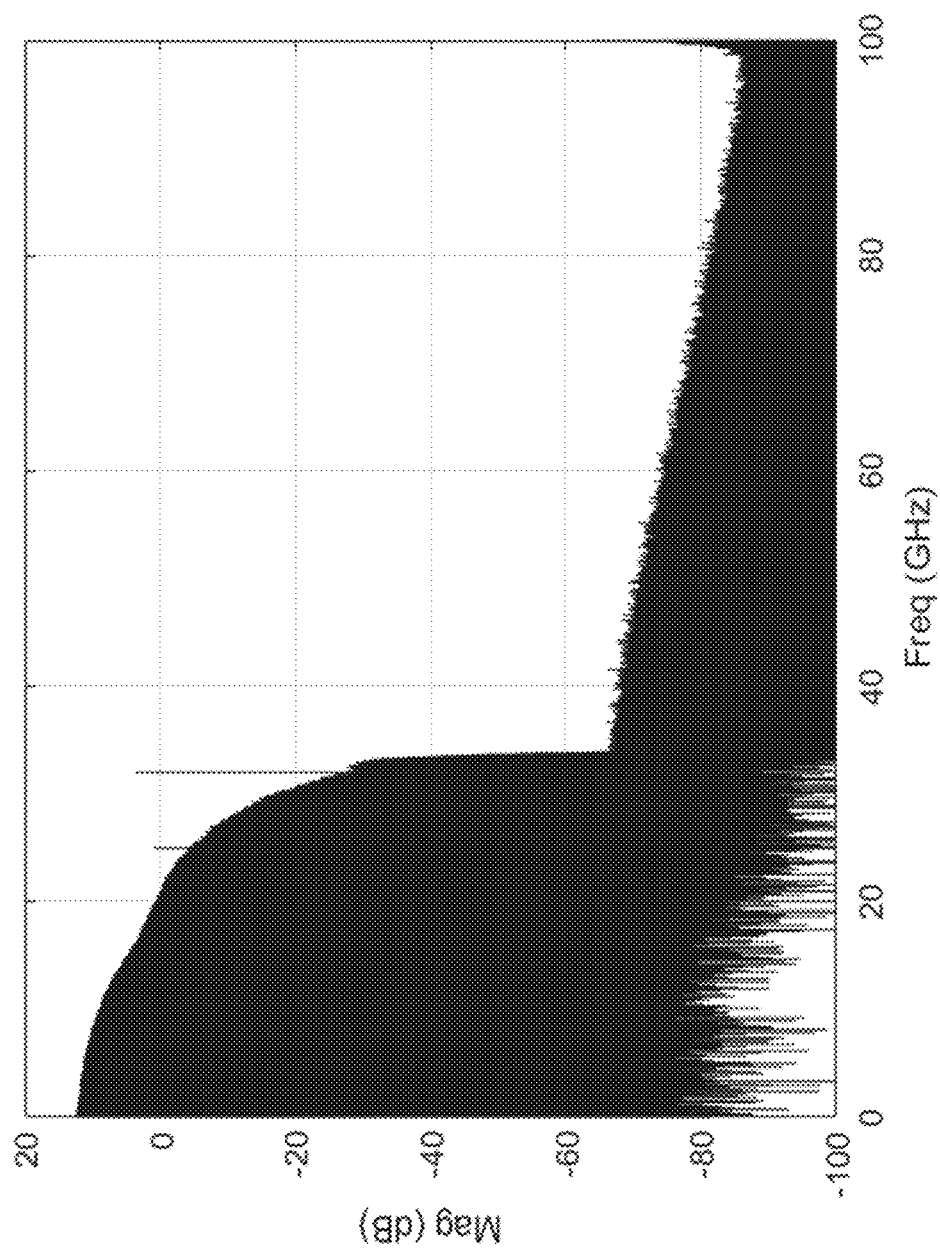
FIG. 2 shows a plot of a signal spectrum on a 200 GigaSamples/sec (GS/s) real-time oscilloscope channel.

In the following example, a 32 GBaud PCIE Gen6 PAM4 signal is acquired on a real-time oscilloscope channel with 33 GHz bandwidth at 200 GS/s. The SymbolRate is 32 GBaud, $f_s$ is 200 GS/s, Bandwidth is 33 GHz. The spectrum plot in FIG. 2 shows that the signal spectrum roughly follows the SINC (also known as "sine cardinal") function profile up to the scope bandwidth. The signal has low energy from 25 GHz to 33 GHz.

Figure 3:
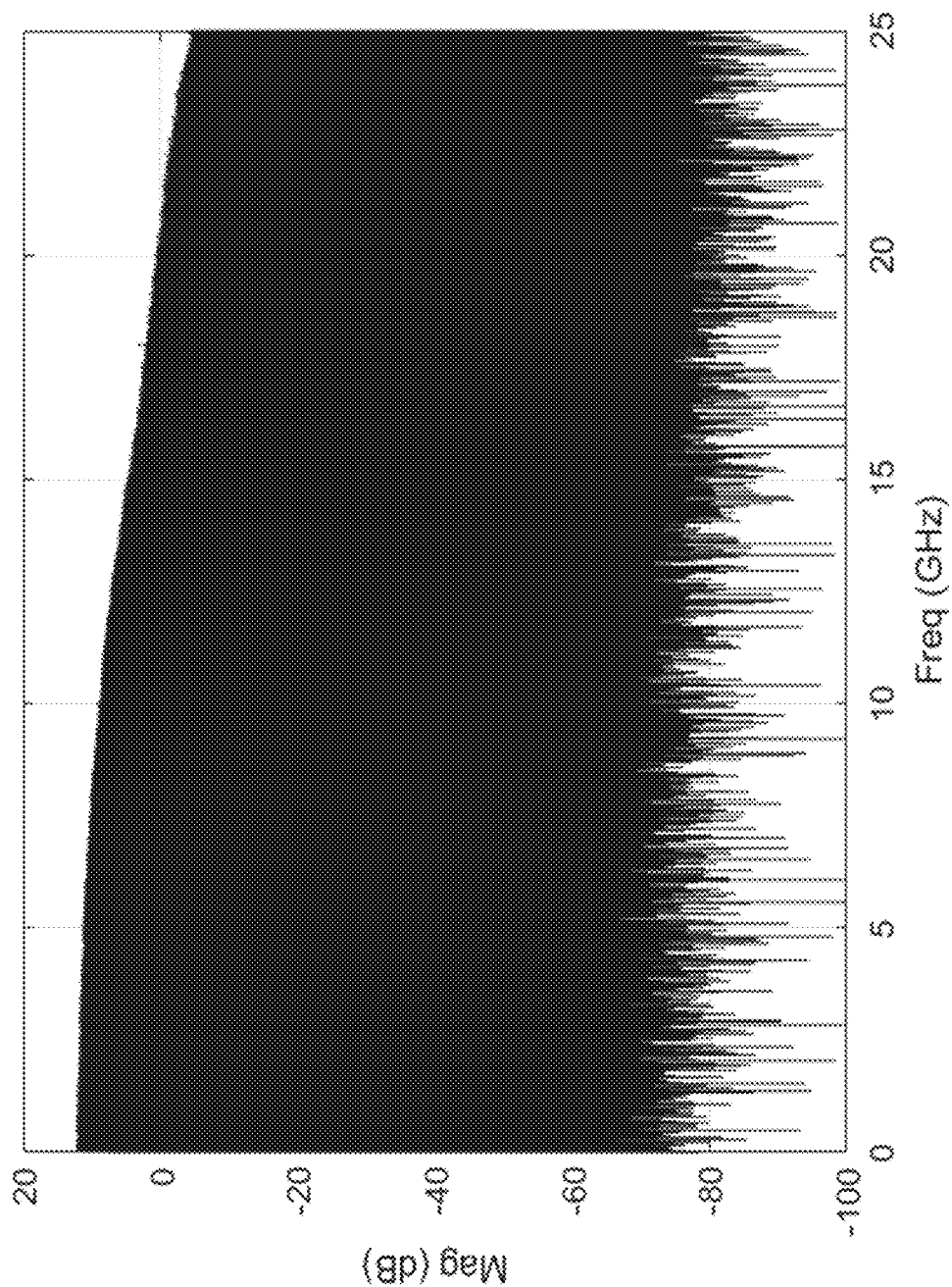
FIG. 3 shows a plot of a signal spectrum on a 50 GS/s real-equivalent-time (RET) oscilloscope with aliasing.

The same signal is acquired on a RET oscilloscope channel, as shown in FIG. 3. The sample rate $f_s$ equals 50 GS/s with the oscilloscope analog bandwidth Bandwidth of 33 GHz. The equations (1) and (2) are both satisfied. This is a Nearly-RT RET oscilloscope case.

The spectrum plot of the Nearly-RT RET oscilloscope acquired waveform, when compared with FIG. 2, shows the low signal energy from 25 GHz to 33 GHz that gets aliased and folded back to 17 GHz to 25 GHz has limited impact on the spectrum profile up to the Nyquist frequency, 25 GHz.

Figure 4:
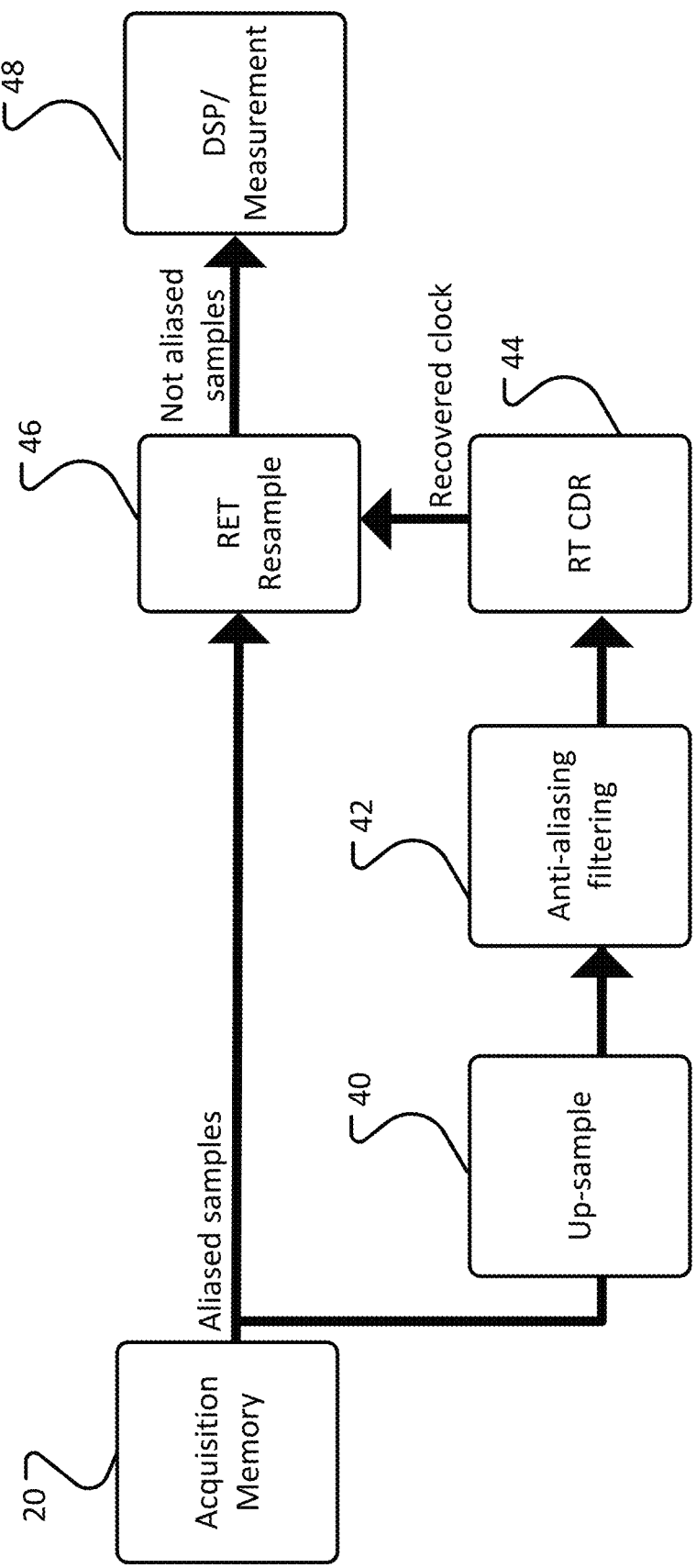
FIG. 4 shows a diagram of an embodiment of a method of nearly real-time (RT) RET clock recovery.

According to an embodiment, the RET clock recovery procedure shown in FIG. 4 takes the aliased samples and creates the RET resampled waveform without aliasing. The test and measurement device will determine whether the Nearly-RT RET operation is available based upon the two conditions shown in the equations (1) and (2) previously mentioned. First, the analog bandwidth of the device is greater than the Nyquist frequency of the sample rate, and second, the device sampling rate is greater than the symbol rate of the input signal. For ease of discussion, and without limitation, the example has a 50 GS/s sample rate for 33 GHz analog bandwidth. The Nyquist frequency is 50 GHz/2, or 25 GHz, and the bandwidth is 33 GHz, since 33 is greater than 25, this situation meets the first condition. The symbol rate of the input signal equals 32 GBaud, and the sampling rate is 50 GS/s, so this situation meets the second condition and aliasing is present.

The one or more processors access the aliased samples of the entire signal from the acquisition memory 20. These are then up-sampled at 40 using some sample rate that does support real-time sampling. The up-sampling rate may be twice the original rate, or 100 GS/s in the example.

Figure 5:
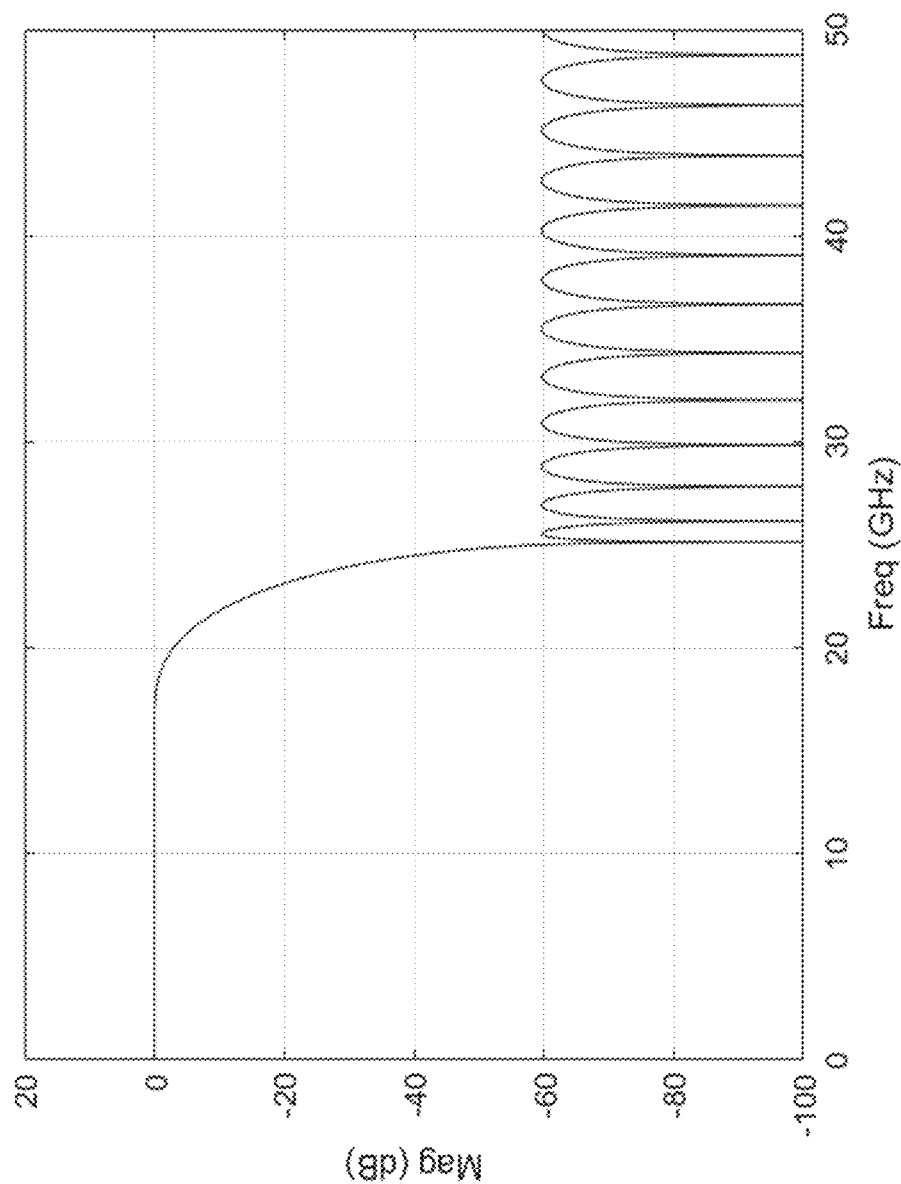
FIG. 5 shows an embodiment of an anti-aliasing filter.

The up-sampling process may introduce unwanted images in the signal spectrum, so the process applies an anti-aliasing filter 42. In one embodiment, this may comprise a low-pass filter. The filtering achieves two goals. First, it reduces the unwanted spectral image generated from the up-sampling. Second, it mitigates the aliased spectrum that resulted from the not sufficient sample rate. In this example, as shown in FIG. 5, the anti-aliasing filter design has bandwidth around 20 GHz, stop band frequency around 25 GHz. The bandwidth of 20 GHz is selected to be higher than the Nyquist frequency of the signal, which is 16 GHz, half of the symbol rate of 32 GBaud. The stop band frequency of 25 GHz is chosen to be the Nyquist frequency of the acquired samples based on their sampling rate of 50 GS/s. The transition band from 20 GHz to 25 GHz mitigates frequency components aliased from 25 GHz to 33 GHz that pass through the oscilloscope analog front end.

With the two goals in mind, this anti-aliasing filter can be adjusted to the signal to maximize the benefits. For example, if a signal has very low energy beyond 25 GHz, then the bandwidth of this anti-aliasing filter can be set to higher value to preserve the energy, based upon the spectrum of the signal. The signal energy distribution over frequency can be observed after the RET resample where the signal is no longer aliased. Designing the anti-aliasing filter may involve a two-step process. First, design a first anti-aliasing filter in a normal way. Second, after the RET resample, analyze the signal spectrum, and design a second, improved anti-aliasing filter.

The process treats the output from the anti-aliasing filtering block 42 as a waveform acquired in a real-time oscilloscope channel, as the sample rate is high enough to support the bandwidth of the signal. In this example, the sample rate is 100 GS/s, more than two times the highest frequency component of the samples outputted from the anti-aliasing filtering block 42, which is 25 GHz. The output then feeds into the real-time (RT) CDR (clock data recovery) module at 44 to create the recovered clock. The real-time software CDR module can use the well-established technique to get recovered clock, for example, the technique described in U.S. Pat. No. 9,596,074, issued Mar. 14, 2017. The real-time software CDR can handle signals with closed eye diagrams. As set out in the '074 patent, the device takes a derivative of the data signal, then computes the square or absolute of the derivative before applying a bandpass filter. The bandpass filter is a windowing function having a spectrum that is wider than the clock and has a flat top and smooth transitions on both sides. The device finds edge crossing times of the filtered result and applies a phase-locked loop or lowpass filter to the edge crossing times in order to recover a stable clock signal. When the improved techniques are implemented in software, they may be used with any number of different equalizers that are required by various high-speed serial data link systems.

The recovered clock from the real-time CDR module is used to resample the aliased samples from the acquisition memory 20, based on the RET concept at 46. Each sample of the aliased samples is assigned to the correct time location in the repeating pattern. After this RET resample module, the output of the non-aliased samples can feed into a digital signal processing (DSP)/Measurement module 48 for further processing.

One should note that, in other embodiments, the up sampling and anti-aliasing filtering may comprise one of other equivalent ways. For example, one could use interpolation with anti-aliasing protection. One of the possible approaches for interpolation uses a SINC interpolation with an additional low pass filtering.

Figure 6:
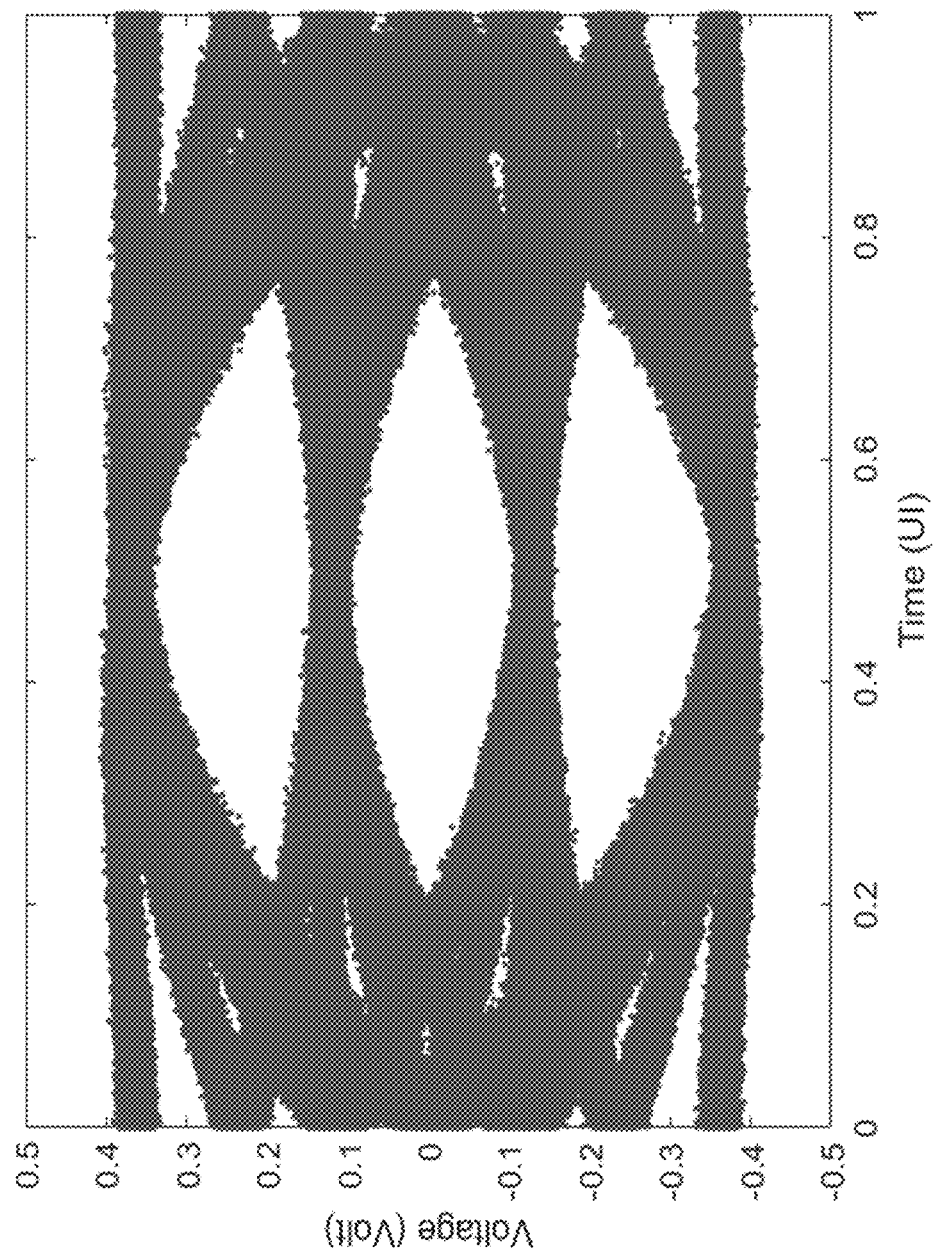
FIG. 6 shows an eye diagram from RET clock recovery.
Figure 7:
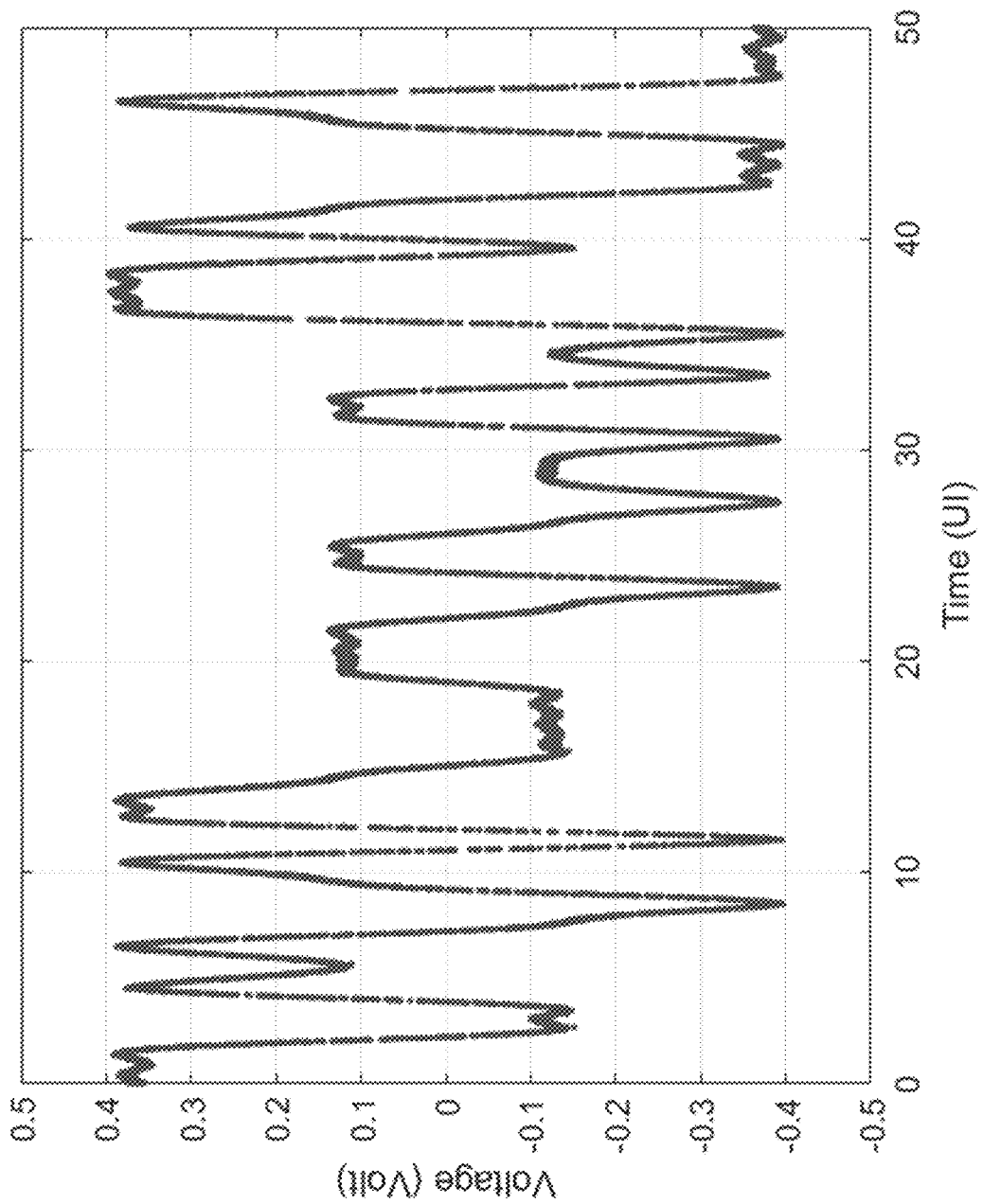
FIG. 7 shows a pattern waveform after RET clock recovery.

FIG. 6 shows an eye diagram of a PAM-4 signal resulting from this process, and FIG. 7 shows the resulting pattern waveform.

Figure 8:
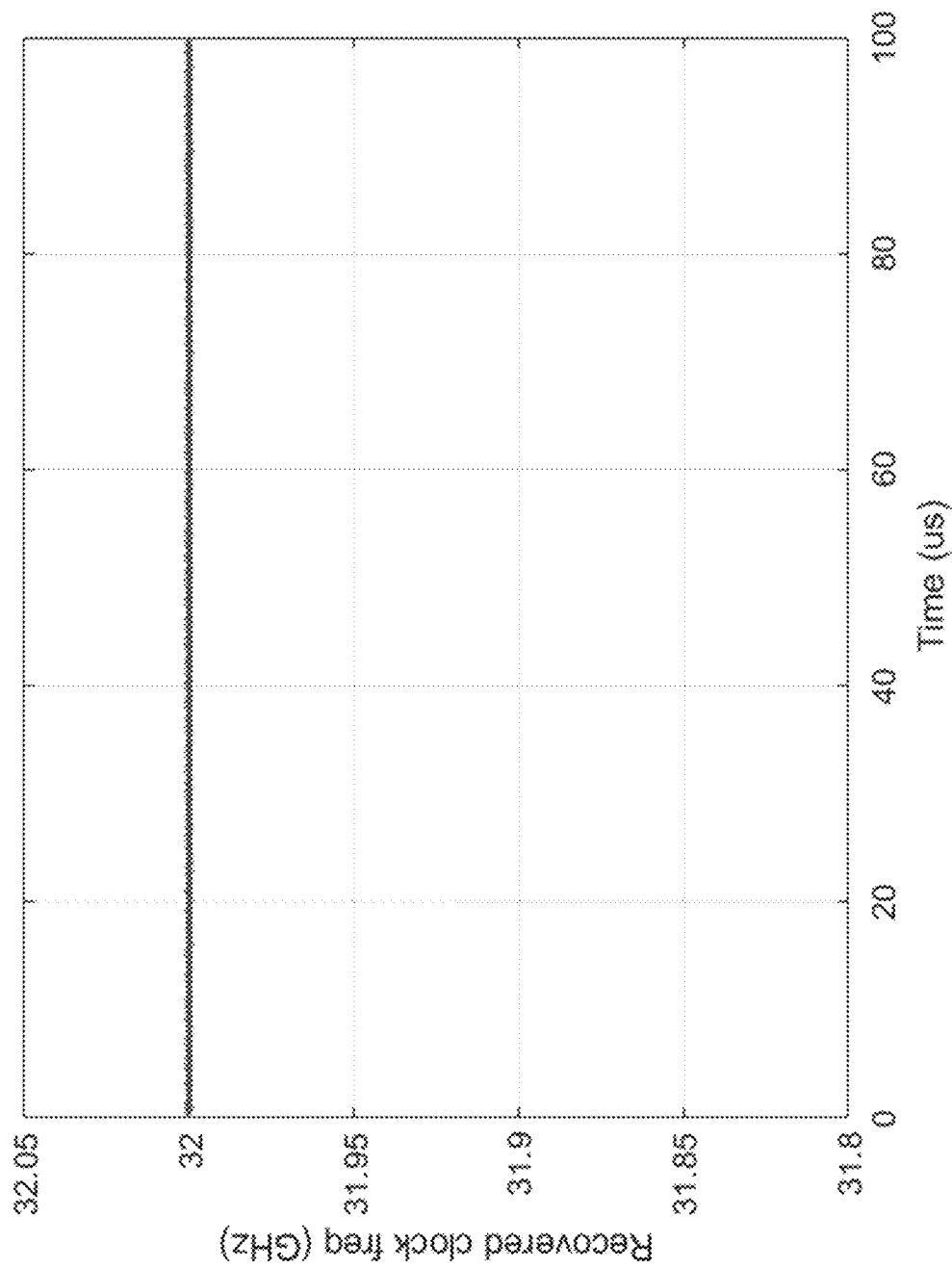
FIG. 8 shows a clock frequency from an RET clock recovery process.
Figure 9:
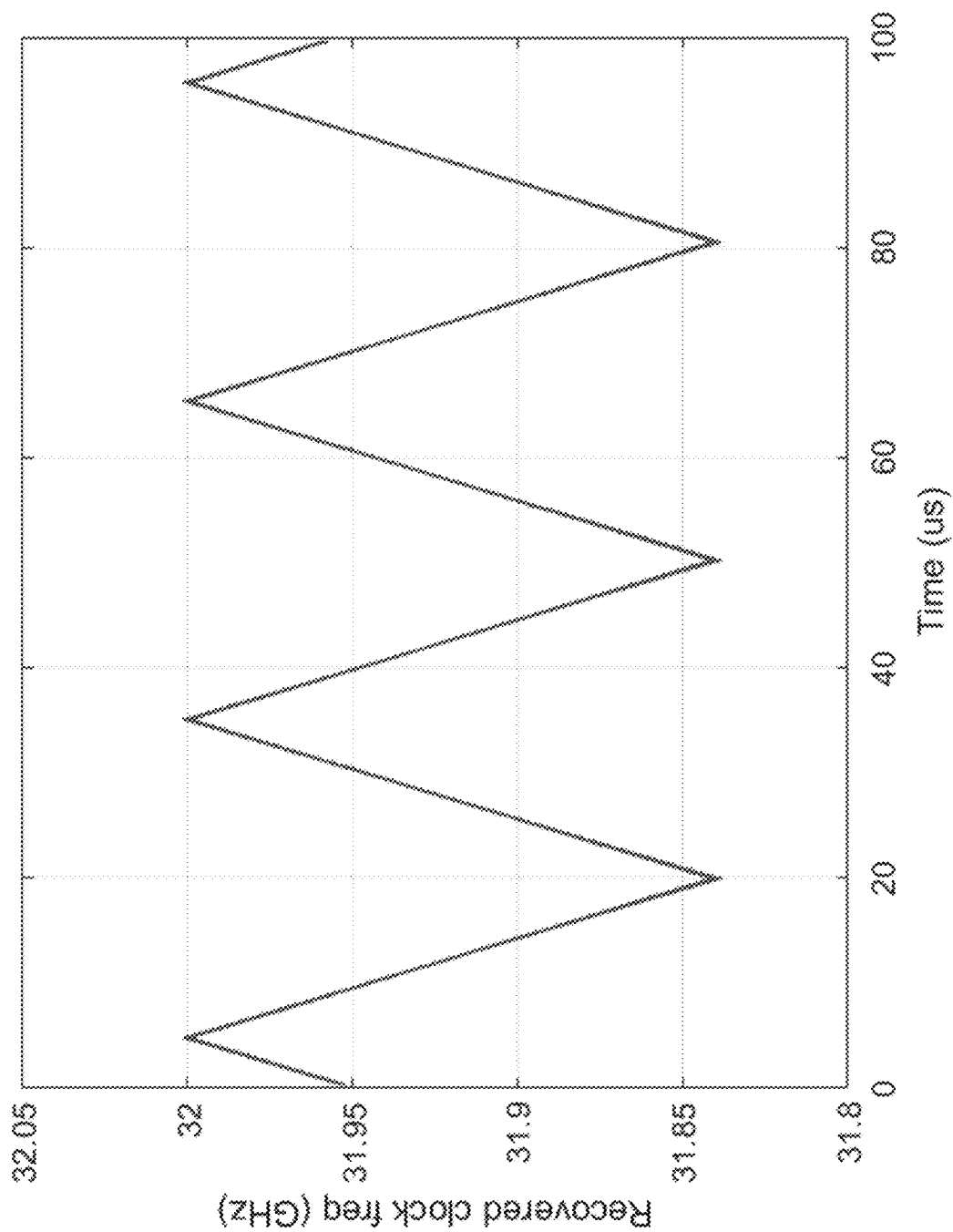
FIG. 9 shows a recovered clock frequency with spread-spectrum clocking (SSC).

FIG. 8 shows the recovered clock frequency, a constant frequency. FIG. 9 shows the recovered clock frequency if the device has spread-spectrum clocking (SSC) turned on.

An advantage of the Nearly-RT RET clock recovery is that it utilizes the known RT CDR to recover the clock, so it can handle signals with large impairments that may cause closed eye diagrams. The RET clock recovery described in Tan may have limited capability to recover the clock accurately when the signal has impairments high enough to cause eye closure.

The Nearly-RT RET oscilloscope may comprise a common setting to enable more high bandwidth channels through RET for mainstream and performance oscilloscopes that have limited ADCs. For example, a 4-channel DPO70000 Series performance oscilloscope with ADCs that support a total of 200 GS/s on all channels combined. With all four channels turned on, the maximum sample rate per channel is 50 GS/s. To enable all four channels with 33 GHz analog bandwidth, the RET mode is needed and it is becomes a Nearly-RT RET situation. Another example is an 8-channel M506 B Series mainstream oscilloscope with ADCs that support a total of 100 GS/s on all channels combined. With all eight channels turned on, the maximum sample rate per channel is 12.5 GS/s. To enable all eight channels with 10 GHz analog bandwidth, the RET mode is needed and it is a Nearly-RT RET situation.

These embodiments here provide a Nearly-RT RET clock recovery that utilize the RT CDR to recover the clock from the aliased RET samples. This method can handle the signals with large impairments that may cause closed eye diagrams. It enables the RET oscilloscope to cover a wide variety of high-speed applications involving NRZ, PAM-n, n-QAM signals, as examples and without limitation.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

EXAMPLES

Illustrative examples of the disclosed technologies are provided below. An embodiment of the technologies may include one or more, and any combination of, the examples described below.

Example 1 is test and measurement device, comprising: an input port configured to receive a signal from a device under test, the signal having a symbol rate; one or more analog-to-digital converters to convert the signal to waveform samples at a sampling rate; and one or more processors configured to execute code that, when aliasing is present in the waveform samples, causes the one or more processors to: up-sample the waveform samples to produce up-sampled samples; use the up-sampled samples to produce a real-time waveform; perform clock recovery on the real-time waveform to produce a recovered clock; and resample the waveform samples using the recovered clock to produce a non-aliased waveform.

Example 2 is the test and measurement device of Example 1, wherein the code that causes the one or more processors to use the up-sampled samples comprises code that causes the one or more processors to apply an anti-aliasing filter to the up-sampled samples to produce the real-time waveform.

Example 3 is the test and measurement device of Example 2, wherein the code that causes the one or more processors to apply an anti-aliasing filter comprises code that causes the one or more processors to apply a low pass filter.

Example 4 is the test and measurement device of Example 3, wherein the code that causes the one or more processors to apply the low pass filter comprises code to cause the one or more processors to apply a low pass filter having a bandwidth higher than a Nyquist frequency of the signal, and a stop band frequency of the Nyquist frequency of the waveform samples.

Example 5 is the test and measurement device of Example 3, wherein the code that causes the one or more processors to apply the low pass filter comprises code to cause the one or more processors to apply a low pass filter having a bandwidth based upon an energy of the signal.

Example 6 is the test and measurement device of Example 2, wherein the code that causes the one or more processors to apply an anti-aliasing filter comprises code that causes the one or more processors to: apply a first anti-aliasing filter; after resampling, analyze the signal spectrum; and apply a second anti-aliasing filter based on the signal spectrum.

Example 7 is the test and measurement device of any of Examples 1 through 7, wherein the one or more processors are further configured to execute code that causes the one or more processors, prior to up-sampling the waveform samples, to: determine if a bandwidth of the test and measurement device is greater than or equal to a Nyquist frequency determined by the sampling rate as a first condition; determine if the sampling rate is greater than the symbol rate as a second condition; and up-sample the waveform samples when the first and second conditions are met.

Example 8 is the test and measurement device of any of Examples 1 through 7, wherein the code that causes the one or more processors to use the up-sampled samples to produce a real-time waveform comprises code to cause the one or more processors to use interpolation with anti-aliasing protection.

Example 9 is the test and measurement device of Example 8, wherein the code that causes the one or more processors to use interpolation comprises code that causes the one or more processors to use SINC interpolation with an additional low-pass filter.

Example 10 is the test and measurement device of any Examples 1 through 9, wherein the code that causes the one or more processors to up-sample the waveform samples comprises code that causes the one or more processors to up-sample the waveform samples at an up-sample rate of at least twice the sampling rate.

Example 11 is a method of acquiring a waveform in a test and measurement device, comprising: receiving a signal from a device under test, the signal having a symbol rate; converting the signal to waveform samples at a sampling rate of the test and measurement device; when aliasing is present in the waveform samples, up-sampling the waveform samples to produce up-sampled samples; using the up-sampled samples to produce a real-time waveform; performing clock recovery on the real-time waveform to produce a recovered clock; and resampling the waveform samples using the recovered clock to produce a non-aliased waveform.

Example 12 is the method of Example 11, wherein using the up-sampled samples comprises applying an anti-aliasing filter to the up-sampled samples to produce the real-time waveform.

Example 13 is the method of Example 12, wherein applying the anti-aliasing filter comprises applying a low pass filter.

Example 14 is the method of Example 13, wherein applying the low pass filter comprises applying a low pass filter having a bandwidth higher than a Nyquist frequency of the signal, and a stop band frequency of the Nyquist frequency of the waveform samples.

Example 15 is the method of Example 13, wherein applying the low pass filter comprises applying a low pass filter having a bandwidth based upon an energy of the signal.

Example 16 is the method of 12, wherein applying the anti-aliasing filter comprises: applying a first anti-aliasing filter; after resampling, analyzing the signal spectrum; and applying a second anti-aliasing filter based on the signal spectrum.

Example 17 is the method of any of Examples 11 through 16, further comprising, prior to up-sampling the waveform samples: determining if a bandwidth of the test and measurement device is greater than or equal to a Nyquist frequency determined by the sampling rate as a first condition; determining if the sampling rate is greater than the symbol rate as a second condition; and up-sampling the waveform samples when the first and second conditions are met.

Example 18 is the method of any of Examples 11 through 17, wherein using the up-sampled samples to produce a real-time waveform comprises using interpolation with anti-aliasing protection.

Example 19 is the method of Example 18, wherein using interpolation comprises using SINC interpolation with an additional low-pass filter.

Example 20 is the method of any of Examples 11 through 19, wherein up-sampling the waveform samples comprises up-sampling the waveform samples at an up-sample rate of at least twice the sampling rate.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific aspects of the disclosure have been illustrated and described for purposes of illustration, it will be understood that various modifications may be made without departing from the spirit and scope of the disclosure. Accordingly, the disclosure should not be limited except as by the appended claims.

I claim:

1. A test and measurement device, comprising:
an input port configured to receive a signal from a device under test, the signal having a symbol rate;
one or more analog-to-digital converters to convert the signal to waveform samples at a sampling rate; and
one or more processors configured to execute code that, when aliasing is present, causes the one or more processors to:
determining that aliasing is present when a Nyquist frequency of the sampling rate is less than or equal to a bandwidth of the device and that the sampling rate is greater than the symbol rate;
up-sample a portion of the signal between the Nyquist frequency and the bandwidth having aliased samples to produce up-sampled samples using a sample rate that supports real-time sampling;
use the up-sampled samples to produce a real-time waveform;
perform clock recovery on the real-time waveform to produce a recovered clock; and
resample the aliased samples using the recovered clock to produce a non-aliased waveform.

2. The test and measurement device as claimed in claim 1, wherein the code that causes the one or more processor to use the up-sampled samples comprises code causes the one or more processors to apply an anti-aliasing filter to the up-sampled samples to produce the real-time waveform.

3. The test and measurement device as claimed in claim 2, wherein the code that causes the one or more processors to apply an anti-aliasing filter causes the one or more processors to apply a low pass filter.

4. The test and measurement device as claimed in claim 3, wherein the code that causes the one or more processors to apply the low pass filter comprises code to cause the one or more processors to apply a low pass filter having a bandwidth higher than a Nyquist frequency of the signal, and a stop band frequency of the Nyquist frequency of the samples.

5. The test and measurement device as claimed in claim 3, wherein the code that causes the one or more processors to apply the low pass filter comprises code to cause the one or more processors to apply a low pass filter having a bandwidth based upon an energy of the signal.

6. The test and measurement device of claim 2, wherein the code that causes the one or more processors to apply an anti-aliasing filter comprises code that causes the one or more processors to:
apply a first anti-aliasing filter;
after resampling, analyze the signal spectrum; and
apply a second anti-aliasing filter based on the signal spectrum.

7. The test and measurement device as claimed in claim 1, wherein the code that causes the one or more processors to use the up-sampled samples to produce a real-time waveform comprises code to cause the one or more processors to use interpolation with anti-aliasing protection.

8. The test and measurement device as claimed in claim 7, wherein the code that causes the one or more processors to use interpolation comprises code to cause the one or more processors to use SINC interpolation with an additional low-pass filter.

9. The test and measurement device as claimed in claim 1, wherein the code that causes the one or more processors to up-sample the portion of the signal comprises code that causes the one or more processors to up-sample the portion at an up-sample rate of twice or more of the sampling rate.

10. A method of receiving a clock from a waveform, comprising:
receiving a signal from a device under test, the signal having a symbol rate;
converting the signal to waveform samples at a sampling rate;
determining that aliasing is present when a Nyquist frequency of the sampling rate is less than or equal to a bandwidth of the device and that the sampling rate is greater than the symbol rate;
when aliasing is present, up-sampling a portion of the signal between the Nyquist frequency and the bandwidth having aliased samples using a sample rate that supports real-time sampling to produce up-sampled samples;
using the up-sampled samples to produce a real-time waveform;
performing clock recovery on the real-time waveform to produce a recovered clock; and
resampling the aliased samples using the recovered clock to produce a non-aliased waveform.

11. The method as claimed in claim 10, wherein using the up-sampled samples comprises applying an anti-aliasing filter to the up-sampled samples to produce the real-time waveform.

12. The method as claimed in claim 11, wherein applying an anti-aliasing filter comprises applying a low pass filter.

13. The method as claimed in claim 12, wherein applying the low pass filter comprises applying a low pass filter having a bandwidth higher than a Nyquist frequency of the signal, and a stop band frequency of the Nyquist frequency of the samples.

14. The method as claimed in claim 12, wherein applying the low pass filter comprises applying a low pass filter having a bandwidth based upon an energy of the signal.

15. The method as claimed in claim 11, wherein applying an anti-aliasing filter comprises:
applying a first anti-aliasing filter;
after resampling, analyzing the signal spectrum; and
applying a second anti-aliasing filter based on the signal spectrum.

16. The method as claimed in claim 10, wherein using the up-sampled samples to produce a real-time waveform comprises using interpolation with anti-aliasing protection.

17. The method as claimed in claim 16, wherein using interpolation comprises using SINC interpolation with an additional low-pass filter.

18. The method as claimed in claim 10, wherein up-sampling the portion of the signal comprises up-sampling the portion at an up-sample rate of twice or more of the sampling rate.

* * * * *